United States Patent [19]

Corrigan

[11] 4,389,223
[45] Jun. 21, 1983

[54] SURFACE CHARACTERISTICS OF BORON RICH CUBIC BORON NITRIDE

[75] Inventor: Francis R. Corrigan, Westerville, Ohio

[73] Assignee: General Electric Company, Worthington, Ohio

[21] Appl. No.: 232,597

[22] Filed: Feb. 9, 1981

[51] Int. Cl.³ .............................................. B24D 3/28
[52] U.S. Cl. ...................................... 51/307; 423/290; 51/309
[58] Field of Search ................... 423/290; 51/307, 309

[56] References Cited
U.S. PATENT DOCUMENTS

| | | | |
|---|---|---|---|
| 3,212,852 | 10/1965 | Bunoy | 423/290 |
| 3,233,988 | 2/1966 | Wentorf et al. | 423/290 |
| 3,745,263 | 10/1973 | Wentorf | 51/307 X |
| 3,852,078 | 12/1974 | Wakatsuki et al. | 51/307 X |
| 3,926,571 | 12/1975 | Labossier | 29/195 |
| 4,089,931 | 5/1978 | Sharma et al. | 423/290 |
| 4,224,380 | 9/1980 | Bovenkirk | 51/307 X |
| 4,289,503 | 9/1981 | Corrigan | 51/307 |

FOREIGN PATENT DOCUMENTS 575856  6/1978  U.S.S.R. .............................. 423/290

Primary Examiner—Mark Bell
Attorney, Agent, or Firm—Douglas B. Little

[57] ABSTRACT

Boron rich cubic boron nitride suitable for use in electroplating processes (e.g. nickel plating) has been made by an acid leaching process. Boron rich aggregated cubic boron nitride grinding grits are leached in a mixture of nitric and sulfuric acids, the following conditions being typical;
(a) volume ratio of 67% nitric acid to 98% sulfuric acid of 10:20;
(b) temperature of 250° C; and
(c) for a time of 1 hour.

The process removes sufficient free surface boron to reduce the conductivity at the surface, resulting in an abrasive which does not overplate.

FIG. 1 is a photomicrograph of a typical plated surface containing the improved CBN grinding grit of this invention, and FIG. 3 is an X-ray diffraction pattern characteristic of this new product.

3 Claims, 4 Drawing Figures

SURFACE CHARACTERISTICS OF BORON RICH CUBIC BORON NITRIDE

TECHNICAL FIELD

This invention is related to a process for improving the plating characteristics of cubic boron nitride (CBN). More particularly, the process is directed toward reducing the tendency of boron rich CBN grit to overplate and to form nodules of the plating metal (e.g. nickel) during the manufacture of electroplated implements, such as grinding wheels.

BACKGROUND

U.S. Pat. No. 2,947,617 describes cubic boron nitride and its preparation by a catalytic, high pressure/high temperature (HP/HT) technique. Other U.S. patents on the subject of the preparation of CBN are: U.S. Pat. Nos. 3,150,929; 3,192,015; 3,701,826; 3,918,931; and 3,959,443. Some patents directed specifically toward the conversion of hexagonal boron nitride (HBN) to cubic boron nitride without a catalyst present are: U.S. Pat. Nos. 3,212,852 and 4,150,098 and British Pat. Nos. 1,317,716 and 1,513,990. Also U.S. Pat. No. 4,289,503 incorporated by reference herein discloses an improved process for converting hexagonal boron nitride to cubic boron nitride and also discloses aggregated grinding grits manufactured by that improved process.

One of the methods for making the aggregated cubic boron nitride abrasive described above in U.S. Pat. No. 4,289,503 comprises the following steps:

(a) a vacuum firing pre-treatment step in which hexagonal boron nitride powder is held at a temperature of about 1400°–1900° C. for a time of about 5 minutes to 4 hours and at an initial pressure of about $10^{-3}$ to $10^{-10}$ mm. Hg. (which would increase to greater than $10^{-3}$ mm.Hg during heating due to nitrogen gas evolution);

(b) mixing the resulting powder with single-crystal CBN particles having a maximum dimension ranging from 5 to 150 microns and in a concentration of 5–30 volume percent single-crystal CBN;

(c) prepressing the mixture from part (b) in a hand press at about 20,000 psi (137.9 kPa);

(d) subjecting the prepressed mixture to the HP/HT process: (i) at a pressure of 55–80 kilobars (preferably 65–75 kbar), (ii) at a temperature of from 1600° C. to the reconversion temperature of cubic boron nitride (preferably 2000°–2300° C.), (iii) for a time sufficient to convert the hexagonal boron nitride to cubic boron nitride and sinter the cubic boron nitride (about 8 minutes), and (iv) in the absence of catalyst and impurities; and (e) recovering the CBN.

In recovering the CBN from the high pressure apparatus, most of the high pressure reaction cell material is physically removed, leaving relatively large pieces of the product specimen with carbon, possibly shield metal and other cell materials present. These pieces are treated with a mixture of sulfuric and nitric acids to remove residual carbon and metal impurities. The undissolved solids are washed in water and then mixed with a mixture of nitric and hydrofluoric acids to dissolve any remaining shield metal and gasket materials from the high pressure cell. This step is followed by a final water wash of the CBN pieces. Large lumps of the CBN may be impact milled to powder, size separated, and ultrasonically cleaned to yield the desired aggregated grit.

Reconversion temperature is defined as that temperature at which boron nitride reconverts from the cubic crystal structure to the hexagonal. This temperature is found along the equilibrium line separating the hexagonal boron nitride stable region from the cubic boron nitride stable region in the phase diagram for boron nitride (see U.S. Pat. No. 3,212,852; FIG. 6 and Column 8, line 66–Column 9, line 42).

The purpose of the vacuum firing is two-fold, first, to remove boric oxide from the surface of the hexagonal boron nitride powder, and secondly, to generate a coating of boron on the surfaces of the powder particles. In order to accomplish this second purpose, it is necessary to carry out the vacuum firing in the boron nitride thermal decomposition range. The relative amount of the free boron developed can be inferred visually from the discoloration of the vacuum fired powder. At the lower firing temperatures (1500°–1650° C.) where only a slight amount of surface boron is generated, vacuum fired powder has a light reddish brown tint. The depth of color increases with increasing firing temperature or time until at the higher firing temperatures (1800°–1900° C.) the particles are covered with a black boron surface coating.

It is not absolutely necessary that the single crystal CBN inclusions of step (b) be used. The above described process can be used with no such inclusions or with other types of inclusions, such as refractory metal powder, so long as the inclusion material does not interfere with the high pressure conversion of hexagonal boron nitride to CBN.

The vacuum fired hexagonal boron nitride converts in the HP/HT process to a polycrystalline material which may be dulled by attritious wear. The alternative embodiments in which the single crystal cubic boron nitride (or other inclusions) are mixed with the vacuum fired powder prior to high pressure/high temperature processing are preferred because they seem to result in an aggregate particle (i.e. polycrystal containing single crystal or other inclusions) having breakdown characteristics which makes it advantageous for use in some grinding applications.

U.S. Pat. No. 3,852,078 discloses bonded CBN bodies in which hexagaonal boron nitride is mixed with CBN before high pressure/high temperature processing, but no pre-treatment of hexagonal boron nitride is required.

The hexagonal boron nitride utilized in the above-described process is ideal hexagonal or graphitic boron nitride (GBN). Two forms of hexagonal boron nitride have been identified, turbostratic and graphitic. The turbostratic structure is characteristic of pyrolytic boron nitride and is a continuous structure characterized by two-dimensional layers of hexagonal rings stacked at irregular intervals and randomly oriented. GBN generally has a more ordered crystal structure than turbostratic or pyrolytic boron nitride. The boron and nitrogen atoms are believed to form more or less parallel stacks of fused BN layers in the hexagonal lattice, with the stacking being fairly ordered in translation parallel to the layers and also in rotation about the normal to the layers. In other words, there are fewer imperfections and distortions within the GBN structure. GBN has a density of about 2.28 g/cm$^3$ and an interlayer spacing of about 3.33 angstroms. The structure in any mass of GBN is continuous in any given direction, as opposed to being separated by crystal boundaries. The material is generally soft, flaky and light in color.

Further details on the two forms of hexagonal boron nitride may be found in Thomas, J. et al., "Turbostratic Boron Nitride, Thermal Transformations to Ordered-layer-lattice Boron Nitride", *J. A. C. S.*, Vol. 84, (Jan. 25, 1963) p.4619; and Economy, J. and Anderson, R., "Boron Nitride Fibers", *J. Polymer Science: Part C*, No. 19, (1967) p. 283.

In the HP/HT process step (d) the pressure and then the temperature are increased and held at the desired conditions for the desired time. The sintered sample is allowed to cool under pressure for a short period of time, and then the pressure is decreased to atmospheric. The mass of polycrystalline cubic boron nitride is then recovered. Care must be exercised in the design of the high pressure cell to ensure against impurity penetration from exterior cell parts into the sample.

Because of the boron coating generated during the pre-treatment step (a) the cubic boron nitride resulting from the above-described process (usually in the form of grinding grit) is itself boron rich. By following the teachings of British Pat. No. 1,513,990 (e.g., incorporating boron powder, aluminum boride, or mixtures of aluminum and boron into HBN in an HP/HT process) one also obtains boron rich CBN. In order to test the performance of the boron rich abrasives in plated tools (e.g. nickel plated grinding wheels) an attempt was made to fabricate a nickel plated wheel. Severe overplating of the abrasive grains occurred which prohibited testing of the wheel and which would prohibit use of the boron rich abrasives in plated tool applications. The invention disclosed herein presents a solution to the severe overplating problem. A discussion of plating problems and solutions for diamond tools may be found in Pope, B. J. and Stark, P., "Synthetic Diamond for Plated Products", In Proceedings: "Diamond in the 80's" A Technical Symposium of Industrial Diamond Assn. of America, Chicago, Ill., Oct. 13-15, 1980, pp. 113-126.

DISCLOSURE OF INVENTION

The invention is summarized as a process for improving the plating characteristics of boron rich cubic boron nitride which comprises leaching the cubic boron nitride with an acid mixture selected from the group consisting of nitric/sulfuric acid mixtures and phosphoric/sulfuric acid mixtures for a time sufficient to yield a cubic boron nitride having a substantial absence of any surface electrically conducting phase which would interfere with electroplating.

The process has been developed using mixtures of 67 weight percent nitric and 98-99 weight percent sulfuric acids. In this description, whenever volume ratios are mentioned, they refer to volumes of acids having these concentrations. The process may be performed using an initial volume ratio of nitric acid to sulfuric acid of from 2:98 to 75:25 (which corresponds to a mole ratio of $HNO_3$ to $H_2SO_4$ of from 0.017 to 2.43), at a temperature range of 100° to 300° C., and for a time of from 10 minute to 12 hours. In the experimental work through which this invention was developed, the acid mixture was initially boiling. With the passage of time, the boiling would cease after the components of higher volatility had boiled off. This would leave an acid mixture higher in concentration of the less volatile acid (usually sulfuric) and at a higher temperature. The experiments were performed by simply placing the boron rich cubic boron nitride grit into a beaker of acid on a hot plate.

After the acid treatment, the resistivity of the particles is sufficient to allow fabrication of electroplated tools. It is believed that this process removes the boron-containing conductive phases from the surface of the particles. Although the mixture of hot nitric/sulfuric acids has been found effective, similar treatment with hot nitric acid alone, with a nitric/hydrofluoric acid mixture or with aqua regia was not effective.

This process substantially eliminates abrasive particle overplating, thus allowing plated wheels and tools to be made with the boron rich CBN abrasives. Specifically, the abrasives developed may be successfully nickel plated; whereas, the untreated abrasive grits may not.

The acids specified (i.e. nitric and phosphoric) are solvents for boron, and it is believed that this treatment removes elemental boron from the surface of the grits. For purposes of this description, the term boron rich means having boron present in a proportion which is substantially greater than the normal stoichiometric amount, which in the case of CBN is a 1:1 rato of boron atoms to nitrogen atoms.

This invention resulted from an investigation of how to make the boron rich grits of U.S. Pat. No. 4,289,503 usable in plated tools. The essence of the invention lies in the discovery of the particular acids and operating conditions which accomplish the desired end. It also lies in the investigation of the differences between the physical properties (i.e., electrical resistance and surface composition) of the treated and untreated cubic boron nitride.

BRIEF DESCRIPTION OF THE DRAWINGS

FIG. 1 shows such a surface containing cubic boron nitride which was treated in accordance with this invention, and FIG. 2 shows a surface containing untreated CBN.

FIG. 3 is an X-ray diffraction pattern of the CBN treated in accordance with this invention, and FIG. 4 is a pattern of the same type of CBN before acid leaching treatment.

BEST MODE FOR CARRYING OUT THE INVENTION

Figure 1:
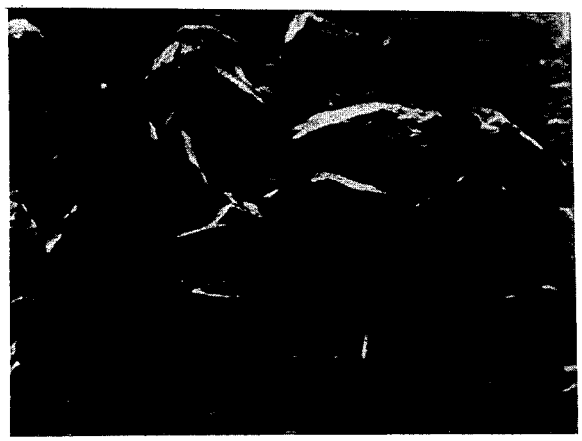
FIGS. 1 and 2 are photomicrographs (magnified 100X) showing nickel plated surfaces containing 60/80 mesh boron rich CBN grits.
Figure 2:
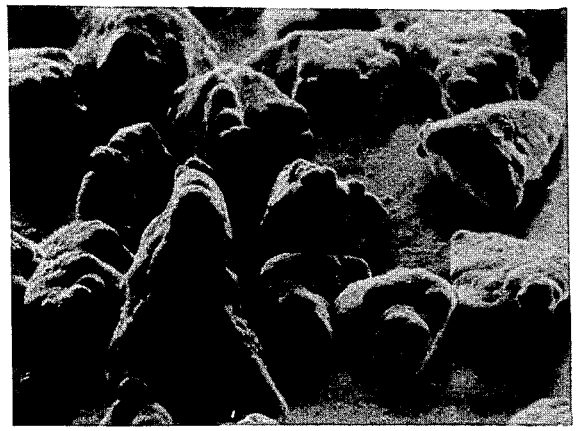

It is preferred that nitric and sulfuric acids be used in the leaching process in an initial volume ratio of nitric acid to sulfuric acid of 4:96 to 10:20 (corresponding to a mole ratio of $HNO_3$ to $H_2SO_4$ of 0.034 to 0.41), and the preferred temperature range is 150° C. or above.

The invention will be further clarified by a consideration of the following examples, which are intended to be purely exemplary. In these examples, after the acid leaching treatment, the CBN grits were rinsed with water and acetone. Boron rich CBN containing single crystal CBN inclusions, as described in the background section, are designated X-7. The designation X-7D3 is given to those grits containing single crystal CBN inclusions having a mesh size of 270 to 325 mesh (54-45 microns), at a concentration of 30 volume percent single crystal CBN.

Hard nickel plating tests were run on various samples. The process of making nickel plated tools containing grits such as diamond or cubic boron nitride is well known in the art. Typically a Watts bath is used. A Watts-type solution utilized for several of the tests described hereinafter comprised the following ingredients:

| | |
|---|---|
| Nickel sulphate-hexahydrate (NiSO$_4$.6H$_2$O) | 100 grams/liter (g/l) |
| Ammonium Sulphate ((NH$_4$)$_2$SO$_4$) | 21 (g/L) |
| Sodium Chloride (NaCl) | 8 (g/l) |
| Ammonium Hydroxide (NH$_4$OH) | Added as needed for pH adjustment |
| Sulfuric Acid | Added as needed for pH adjustment |

A trace amount of wetting agent was also used.

The general plating procedure was as follows: First, the pH of the plating solution was adjusted to about 5.3 with the ammonium hydroxide and then back to about 4.9 with sulfuric acid. Second, the anode lead was connected to a nickel anode in an anode bag, and the cathode lead was connected to the sample holder. Third, a well cleaned brass cathode disc was mounted in the sample holder or plating fixture, a quantity of the cubic boron nitride grit was placed on top of the cathode, and the plating fixture was immersed in the plating solution or electrolyte. Fourth, the plating current was increased to the appropriate current density (e.g. 3.2 amperes per square decimeter) and plating was conducted for a sufficient time to tack down the abrasive and plate over the spaces on the cathode between the abrasive grains. It is recommended that the sample holder be tapped at 5 minute intervals to dislodge hydrogen bubbles. The term "tack down" refers to the build up of nickel on the cathode around the CBN grits which is the mechanism whereby the grits are held to the cathode plate or substrate. Tack down time varies with the size of the grits, increasing with increasing grit size. The overplate time (i.e., the additional time needed to plate over the remaining spaces on the cathode) also increases with increasing grit size. Typical total plating times would range between 20 minutes and 3 hours.

Some references on nickel plated abrasive tools and electroplating in general are: Grenier, J. W. and Palovchik, S. T., "Electroplated Tools Fabrication and Performance", presented at Diamond—Partner in Productivity a Technical Symposium Presented by Industrial Diamond Association of America, Inc., Nov. 11–12, 1974, Washington, D.C.; Ollard, E. A., *Introductory Electroplating*, Robert Draper Limited, Tedington, England, 1969. *Metal Finishing*, 49th Guidebook-Directory Issue, 1981, Metals and Plastics Publications, Inc., Hackensack, N.J.; Graham, K. A., *Electroplating Handbook*, 3rd ed., Van Nostrand Reinhold Co., N.Y., 1971; Brimi, M. A. and Luck, J. R., *Electrofinishing*, American Elsevier Pub. Co., Inc., N.Y. 1965; Lowenheim, F. A., *Electroplating*, McGraw Hill Book Co., 1978.

In the manufacture of plated tools there is a minimum metal coating thickness (as a percent of average grit diameter or micron size) needed to retain the grit. The acid leached grits of this invention are rough and have an irregular shape allowing them to be strongly held in the metal bond. It is believed that the minimum nickel coating thickness is therefore less than that required for presently available single crystal CBN grit. This permits a greater portion of the acid leached grits to protrude and do the work of grinding. On the other hand, at normal nickel thicknesses, the grits would be held for a longer time, giving better tool life.

Certain terminology has been used to report the plating results. As used in the following examples, the term overplate means the encapsulation of abrasive grains in nickel. A nodule is a lump of nickel coating. Percent nodules equals the total number of nodules observed on CBN grits or grains (in 3 microscopic fields) divided by the total number of CBN grains observed in those 3 microscopic fields, that quotient being multiplied by 100 to obtain percent.

EXAMPLE I

Small quantities of boron rich CBN particles were prepared and leached with various acids as listed in Table 1. After acid treatment and rinsing with water and acetone, hard nickel plating tests were run on these various samples. The results are given in Table 1.

TABLE 1

Hard Nickel Plateability Tests

| Sample | Mesh Size | Pretreatment** | Results |
|---|---|---|---|
| X-7D5* | 80/100 (180/150 micron) | HNO$_3$/H$_2$SO$_4$ - 6 hrs. | 3-5% Nodules |
| X-7D3 | 45/50 (350/300 micron) | None | 99% Overplated |
| X-7D3 | 60/80 (250/180 micron) | HNO$_3$ - 5 hrs. | 100% Overplated |
| X-7D3 | 80/100 (180/150 micron) | None | 100% Overplated |
| X-7D3 | 80/100 | HNO$_3$/H$_2$SO$_4$ - 12 hrs. | 2% Nodules |

*X-7D5 Boron rich polycrystalline CBN containing 20 volume percent 230/270 Mesh (63/53 micron) catalyst grown CBN crystal inclusions
**Heated on hot plate for times indicated.

The above results indicate that nitric/sulfuric acid mixtures are effective in leaching the particles sufficiently to allow their use in plated tool applications. Surface leaching of the particles was also inferred from the visual appearance of the particles—the virgin and HNO$_3$ treated samples (all overplated) had a smooth shiny appearance while the leached HNO$_3$/H$_2$SO$_4$ treated samples developed a dull matted appearance.

EXAMPLE II

A number of experiments looking at the effects of acid concentration, temperature and time on the leaching process as related to the plateability of the leached material have been run.

In these experiments the samples and desired acid mixtures contained in glass beakers were placed on a preheated hot plate for the desired leaching time. After leaching, the acid was decanted and the sample rinsed with water, cleaned in an ultrasonic water bath, rinsed with acetone and air dried. In some of the experiments the samples were removed periodically from the hot plate after a given time interval, the acid decanted and replenished with fresh acid and reheated. After leaching, the samples were subjected to hard nickel plateability testing.

The leaching conditions and plateability test results are given in Table 2. Except for experiments 8 and 9, various mixtures of nitric and sulfuric acids were used as the leaching medium (prepared from technical grade 67% nitric and 98-99% sulfuric acids). The samples used were 80/100 or 120/140 mesh size boron rich polycrystalline aggregates containing 20%, 30-45 micron sized CBN crystals prepared as described in U.S. Pat.

No. 4,289,503 and the Background section of this description.

TABLE 2
Leaching - Plateability Test Results

| Test # | Initial Volume Percent $HNO_3$ in Mixture | Total Leaching Time-hrs | Leaching Interval hrs | Hot Plate Temperature | Plateability Test Results |
|---|---|---|---|---|---|
| 1 | 33⅓ | ¼ | — | 357° C. | Partial overplating |
| 2 | " | 1 | — | " | Partial overplating |
| 3 | " | 2 | 1 | " | Few Nodules |
| 4 | " | 2 | — | " | Partial overplating |
| 5 | " | 4 | 2 | " | Few nodules |
| 6 | " | 4 | — | " | Partial overplating |
| 7 | " | 8 | 2 | " | Ni free |
| 8 | 0 | 2 | — | " | 100% overplated |
| 9 | * | 2 | — | " | 100% overplated |
| 10 | 50 | 1 | — | " | Partial overplating |
| 11 | 50 | 1 | — | 245° C. | Partial overplating |
| 12 | 33⅓ | ½ | — | 405° C. | Partial overplating |
| 13 | 16⅔ | ½ | — | " | Few Nodules |
| 14 | 8⅓ | ½ | — | " | Ni free |
| 15 | 16⅔ | 1 | ½ | " | Very few nodules |
| 16 | 8⅓ | 1 | ½ | " | Ni free |
| 17 | " | ½ | — | 357° C. | Ni free |
| 18 | " | 1 | — | " | Ni free |
| 19 | 4 | ½ | — | " | Partial overplating |
| 20 | 4 | 1 | — | " | Ni free |
| 21 | 4 | ½ | — | 405° C. | Ni free |

*Aqua Regia

The results in Table 2 show that various $HNO_3/H_2SO_4$ mixtures can be used for leaching the boron rich abrasives to Ni free state (i.e., no overplating or Ni nodules formed during hard nickel plating). The data also show that although nitric acid is necessary to the process, leaching efficiency is best at the lower nitric acid concentrations. At the higher nitric acid concentrations, periodic refreshening of the acid mixture is required, compare results for test numbers 3, 4, 5, 6, and 7.

At this point, it should be mentioned that later experiments demonstrated that the actual temperature of the leaching solution was substantially lower than the temperature of the hot plate on which the beaker stood, thus the differences between the temperatures in Table 2 and those appearing under the heading Disclosure of Invention previously.

It has been found that the friability of the cubic boron nitride grits increases with increasing leaching time. This fact could provide a method of varying the friability of the CBN to match that needed for a given application.

EXAMPLE III

Comparative slot grinding tests have been made on the series of catalyst grown CBN and leached boron rich polycrystalline CBN nickel plated grinding wheels. These tests consisted of repetitive grinding of slots in hardened M-2 steel workpieces with the relative performance being determined by the number of slots ground over the lifetime of the grinding wheels. M-2 steel is a molybdenum based high speed tool steel with a Rockwell C hardness of 60-62. The tests were in wet grinding using a water soluble oil under the conditions shown in Table 3 and the results are tabulated in Table 4.

TABLE 3
Test Conditions

| | |
|---|---|
| Machine: | 3 HP |
| Wheel Size: | 152 mm × 6.35 mm × 31.8 mm full radius (¼ in. wide × 6 in. nominal dia.) |
| Wheel Speed: | 28.4 × M/second |
| Downfeed: | 1.27 mm |
| Table Speed: | 0.30 M/min (12 in/min) |
| Metal Removal Rate: | 82.4 $cm^3$/hr |
| Workpiece: | M-2 Steel HRC 60-62 102 mm × 152 mm × 51 mm |
| Slots/Workpiece: | 15 (152 mm long) |

TABLE 4
Test Results

| Abrasive | Number of Slots Ground |
|---|---|
| Control I | 855 |
| Control II | 240 |
| Control III | 725 |
| X-7D3 | 1740 |

The control samples were various commercially available single crystal cubic boron nitride grits.

EXAMPLE IV

Slot grinding tests similar to those described in Example III were done at 0.40 M/min (16 in/min) table speed giving the results shown in Table 5.

TABLE 5

| Abrasive | Number of Slots Ground |
|---|---|
| Control I | 510 |
| Control II | 237 |
| Control III | 450 |
| X-7DP* | 1890 |

*Boron rich polycrystalline CBN containing 20 volume percent 20-40 micron catalyst grown CBN crystal inclusions.

EXAMPLE V
Leaching—Resistivity Effects

Electrical resistance measurements were taken on untreated and leached 60/80 mesh size (250/180 micron) samples of boron rich CBN aggregates. The leached samples were treated with 33⅓% $HNO_3/H_2SO_4$ mixtures for various durations at a hot plate temperature of 357° C., the acid being changed at one hour intervals. Resistance values were obtained by pressing the same amount of sample between metallic conductors at a given force and measuring the resistance across the pressed sample.

TABLE 6
Resistance Test Results

| Sample | Resistance (ohms) |
|---|---|
| Control I* | $10^7 - 10^8$ |
| X-7 - Unleached | $2 \times 10^4$ |
| X-7 - Leached 2 hrs. | $1.7 \times 10^8$ |
| X-7 - Leached 8 hrs. | $5.6 \times 10^8$ |

*Obtained as BORAZON® I (60/80 mesh) CBN.

The better than four orders of magnitude increase in resistance obtained on leaching correlates with the improvement in plateability obtained by leaching. The low resistance and overplating experienced with the untreated material is attributed to a conductive phase in the boron rich CBN particles which is removed (at least to some depth on the surface) by the leaching process.

Tests have been performed to investigate the effects of long term storage of the abrasive in the nickel plating solution. In one such test, after 29 weeks in the plating solution, the abrasive showed no ill effects. This is not surprising since the leached samples do not rely on a high resistance coating on the crystals which could be attacked by the acidic plating bath.

In an effort to further characterize the surface of the new cubic boron nitride formed by the process of this invention, X-ray diffraction scans were made on a number of samples of varying boron content. Two fairly strong peaks in addition to the normal CBN peaks were observed in all samples, with the peak heights increasing with increasing boron content. These two additional peaks correspond to the two strongest peaks reported by Wentorf ("Boron: Another Form", *Science*, Jan. 1, 1965, Volume 147, No. 3653, pp 49–50) for high pressure boron. These results would indicate that at least a portion (probably a major portion) of the boron (generated on the graphitic boron nitride in the pre-treatment step described under Background) remains in the elemental state during high pressure/high temperature processing.

Figure 3:
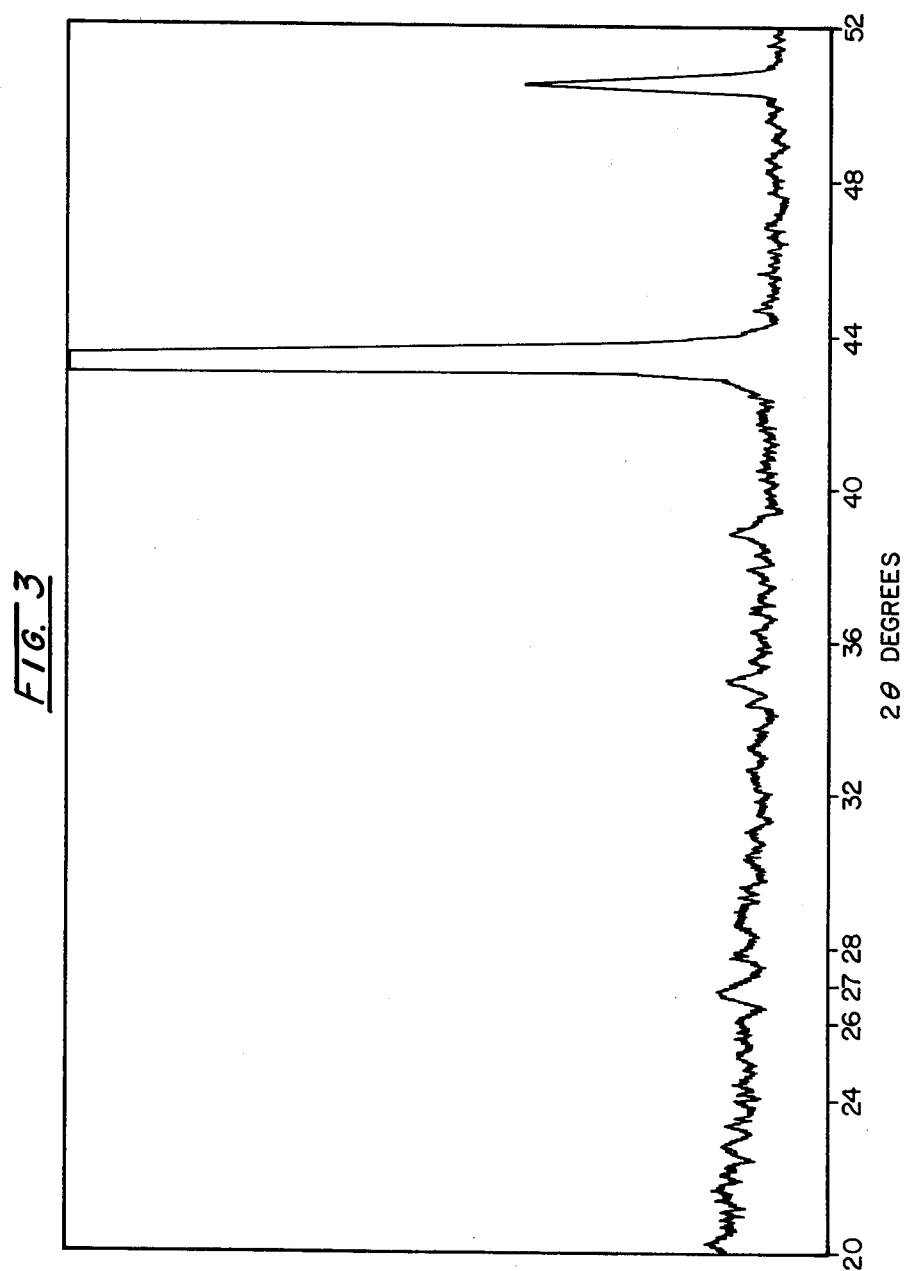
FIGS. 3 and 4 illustrate X-ray diffraction patterns taken of the surface of boron rich CBN. The horizontal axis is $2\theta$ degrees, and the vertical axis is relative intensity.
Figure 4:
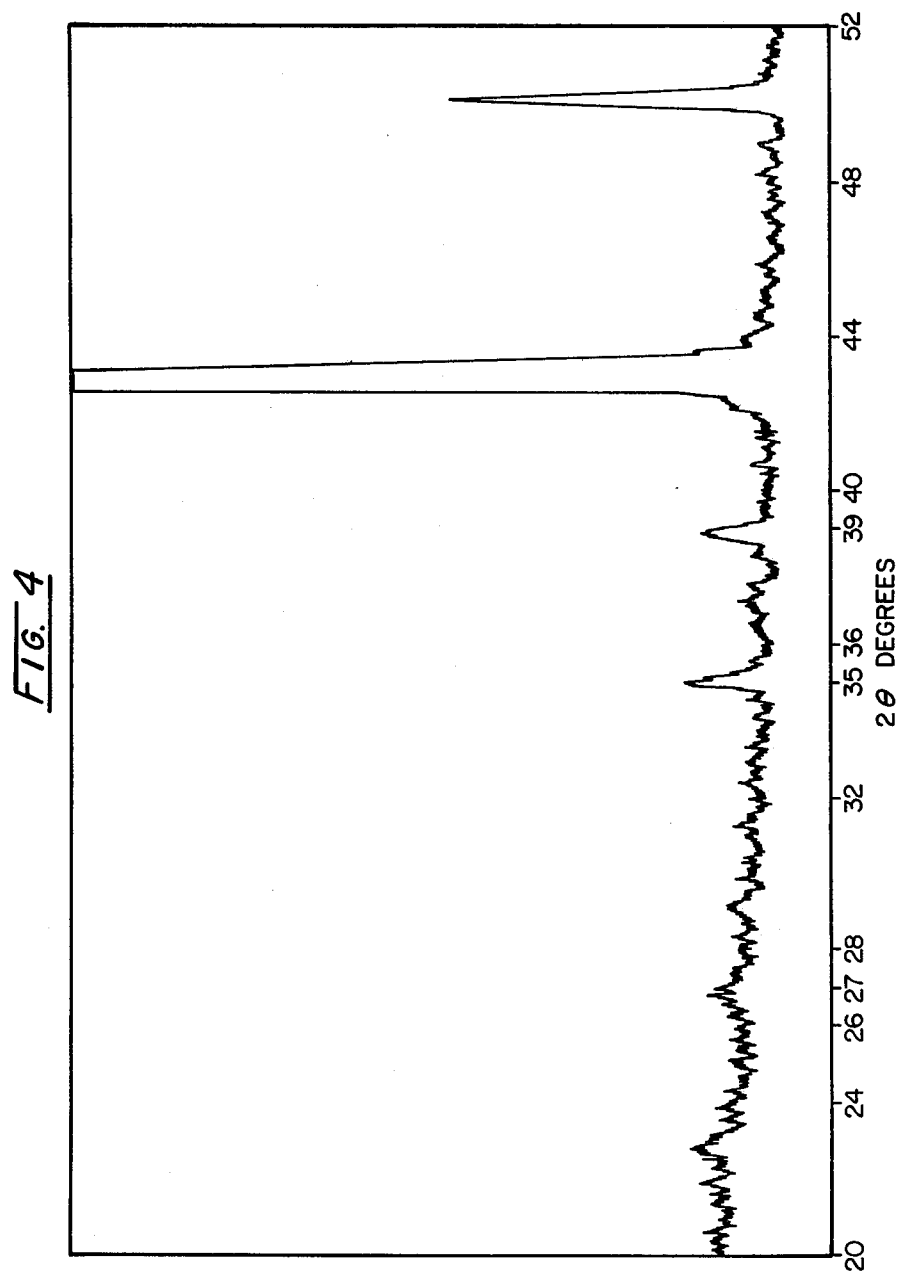

FIGS. 3 and 4 are portions of the X-ray diffraction patterns for a typical sample of the leached boron rich grit and the unleached grit respectively. The two large peaks at about 43° and 50.5° are characteristic of cubic boron nitride. The two smaller peaks appearing at about 35° and 39° are characteristic of the high pressure boron phase discovered by Wentorf. These $2\theta$ values correspond with the DeBye-Scherrer d-values of 2.51–2.54 and 2.30–2.32 reported in the Wentorf article. These peaks in FIG. 3 are about $\frac{1}{3}$ to $\frac{1}{2}$ the size of the corresponding peaks in FIG. 4, indicating a removal of the high pressure boron phase in the leaching operation. It is felt that the leaching process described herein may be used as a general one for removal of high pressure phase boron from solid materials.

Other embodiments of this invention will be apparent to those skilled in the art from a consideration of this specification or practice of the invention disclosed herein. Various omissions, modifications and changes to the principles described herein may be made by one skilled in the art without departing from the true scope and spirit of the invention which is indicated by the following claims.

What is claimed is:

1. An improved boron rich cubic boron nitride having a substantial absence of any surface electrically conducting phase which would interfere with electroplating and which specifically does not interfere with the electroplating of nickel in the manufacture of nickel plated objects containing cubic boron nitride.

2. The improved boron rich cubic boron nitride as recited in claim 1 which is characterized as an aggregated cubic boron nitride consisting essentially of single-crystal, catalyst-grown cubic boron nitride embedded in a matrix of boron-rich polycrystalline cubic boron nitride made from graphitic hexagonal boron nitride.

3. A metal plated grinding implement containing grit made from the improved cubic boron nitride of claim 2.

* * * * *